Oct. 29, 1968   W. T. CAMM   3,407,511
ROTARY DRYER FOR AGGREGATE
Filed May 16, 1967   2 Sheets-Sheet 1

INVENTOR/S
WILLIAM T. CAMM,
BY *Melville, Strasser, Foster and Hoffman*
ATTORNEYS Oct. 29, 1968  W. T. CAMM  3,407,511
ROTARY DRYER FOR AGGREGATE
Filed May 16, 1967  2 Sheets-Sheet 2

INVENTOR/S
WILLIAM T. CAMM,
BY *Melville, Strasser, Foster and Hoffman*
ATTORNEYS

United States Patent Office 3,407,511
Patented Oct. 29, 1968

3,407,511
ROTARY DRYER FOR AGGREGATE
William T. Camm, Fort Thomas, Ky., assignor, by mesne assignments, to American Hoist & Derrick Company, St. Paul, Minn., a corporation of Delaware
Filed May 16, 1967, Ser. No. 638,889
10 Claims. (Cl. 34—109)

ABSTRACT OF THE DISCLOSURE

A cylindrical drum mounted for rotation about a slightly inclined horizontal axis, having on its interior surface a plurality of lifting flights extending nearly the full length of the drum, and having transverse cross braces extending between the flights and supporting a screen.

Background of the invention

This invention relates to an improved construction for a rotary dryer, and particularly to a rotary dryer of the type used for the drying of aggregate in an asphalt plant. In a typical operation of this type, both the liquid asphalt and the aggregate are heated to a temperature on the order of 300° F. The liquid ashpalt is heated to facilitate spraying a uniform application to the aggregate in the pugmill. Similarly, the aggregate is heated to produce a dry surface condition for achieving asphalt adhesion and coating, and to retain sufficient heat in the mix to control viscosity during mixing, hauling and paving operations.

The aggregate for an asphalt plant will include a continuous range of particle size from the largest particles having a diameter of 1¼" or more down to 200 mesh minus. It will of course be recognized that varying amounts and conditions of interior moisture will exist in such particles in an asphalt plant stock pile. These variations may be caused by daily moisture variations, the different aggregate types encountered (containing different pore structures), and the like.

It is widely recognized in the industry that during the heating of the aggregate, a portion of the available heat in the dryer is used for removing interior moisture. It is also recognized that the frequent presence of residual moisture in the aggregate has been a persistent problem.

Nearly all bituminous engineers at one time or another have encountered paving mixtures which showed very pronounced evidence of residual moisture in the fresh mixture, in the form of slumping in the truck, foaming on the coarse aggregate, condensed water dripping out of the truck box, or segregation behind the paver. The widespread existence of this experience has caused a great deal of discussion as to possible causes, and cures.

A further indication of the importance of this problem is noted by the fact that substantially ⅘ of the highway departments of the United States specify maximum residual moisture requirements in asphaltic concrete aggregates at the time of mixing or immediately after mixing. Of the 40 highway departments specifying moisture control, some 22 have placed a numerical moisture limit in the form of a maximum percentage, while the remainder state the requirement in more general terms. While one of these states will permit a residual moisture content up to 3.0%, the bulk of the states require far lower percentages, and it is the aim of the instant invention to provide a dryer construction which will reduce the residual moisture of the aggregate to less than 0.5%.

The typical dryer of the prior asphalt plant comprises a cylindrical drum rotated about an axis inclined very slightly from the horizontal. The interior surface of the drum includes a plurality of lifting flights, such that the material loaded at the higher end of the dryer will, by rotation, be lifted and dropped in a veil form through the drum. The material being dried passes to the discharge end of the drum simply by virtue of the inclination of its axis from horizontal, and the rotation and lifting described above.

Heating is accomplished by means of a burner disposed at the lower end of the drum, and generally includes an exhaust blower or the like at the opposite end of the drum to establish the optimum fuel air ratio, withdraw products of combustion and moisture, and to increase the flame penetration.

Very detailed studies by the prior art have attempted to reduce the residual moisture by concentrating on a number of phases of dryer operation. For example, it is known that a normal dryer operation produces a veil defined by the number of flights, their configuration, the speed of rotation of the drum, and the quantity of material in the drum. The prior art has endeavored to control the veil density and pattern in order to maximize the drying and minimize residual moisture in the aggregate passing through the dryer. That is, some manufacturers design flights permitting aggregates to fall in streams from the flights, leaving channels for the flowing hot gases, while other use a more constant veil density with less stream effect. Similarly, the speed of rotation of the drum, and the size of the drum will effect the veil density and pattern, and can be varied to achieve optimum conditions.

Similarly, the prior art has investigated the effect of varying the quantity of heat supplied and the rate at which the heat is supplied. It is well known that these factors can be investigated and varied, again to achieve optimum conditions.

Finally, the art also recognizes that varying the feed rate for the aggregate, or the resident time of the aggregate in the dryer will also alter heating and drying performance. Again, these factors can be investigated and changed to produce optimum results.

But in spite of the nature and extent of these investigations, it has been impossible to produce a commercial dryer which will under a variety of operating conditions, provide aggregate with less than 0.5% residual moisture at the time of mixing with the liquid asphalt.

Summary

Briefly considered, this invention contemplates the provisions of staggered, cup shaped lifting flights, and of substantially perpendicular cross braces extending between opposite lifting flights within the rotary drum. These cross braces in turn support in effect four screen sections, joined at their centers, and spaced at their longitudinal edges a short distance from the edge of the lifting flight to which the cross braces are secured. The screen will have an opening size large enough to permit the smaller aggregate to pass through, but small enough to retain the coarser aggregate particles, thereby retaining these particles in a position to get the maximum drying effect from the heated gases.

Description of the preferred embodiment

Figure 1:
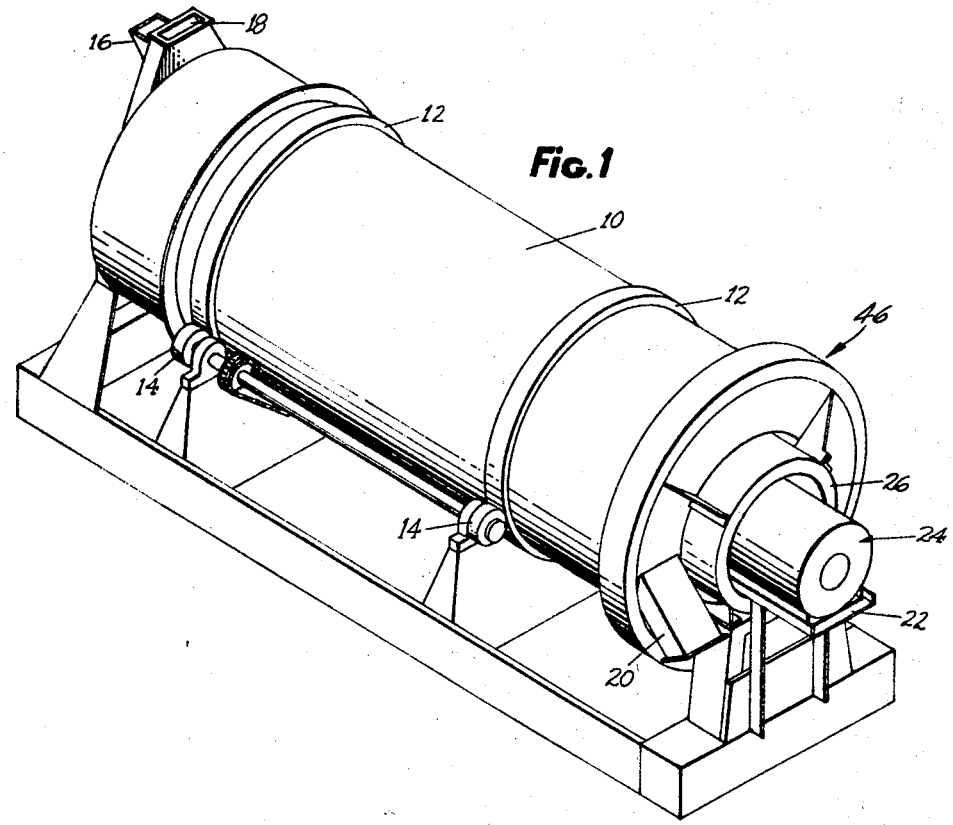
FIGURE 1 is a perspective view showing a typical rotary dryer to which this invention might advantageously be applied.

Referring now to FIGURE 1, the typical dryer to which this invention may be applied is shown in perspective. The dryer includes the generally cylindrical drum 10 having the external driving tires 12. These tires 12 are rotatably supported by the rollers 14, which in turn are driven in any suitable manner to rotate the drum about its axis. In operation, the axis of the drum is inclined slightly from horizontal.

The inlet or charging end of the dryer includes the inlet chute, a portion of which is seen at 16 and the opening 18 which will be connected to a suitable exhauster (not shown).

At the discharge end of the dryer is a suitable discharge chute 20 from which the aggregate is conveyed to further operational stations for gradation, weighing, and mixing with liquid asphalt. It will also be seen that the discharge end includes the bracket 22 which supports the ignition tile indicated generally at 24. A suitable burner (not shown) will be arranged to fire concentrically through the ignition tile.

The discharge end of the dryer also includes a portion indicated at 26 formed of a high temperature refractory material.

Referring now to FIGURES 2 through 5, the interior construction of the drum 10 will be described. As will be apparent in FIGURE 2, the portion of the drum immediately adjacent the inlet end includes a plurality of angular flights 28. These flights are flat pieces of stock welded or otherwise secured to the interior of the drum at an angle on the order of 60° to the axis of the drum. The purpose of these flights is to insure that all material entering the drum is rapidly conveyed into the next section of the dryer and away from the inlet end. This of course prevents clogging or overflow of material at the inlet end of the dryer.

Figure 3:
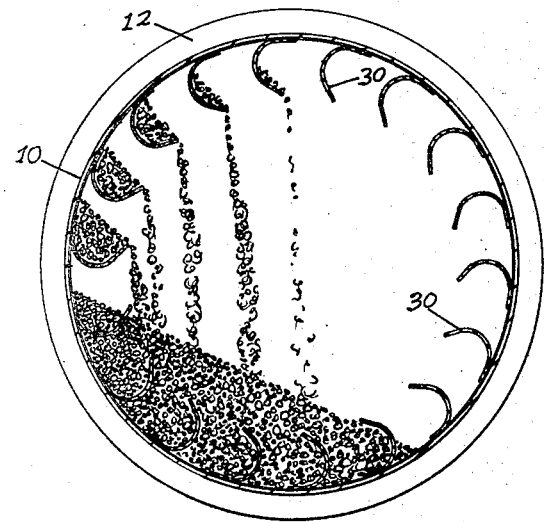
FIGURE 3 is a cross sectional view along the line 3—3 of FIGURE 2.

The next section of the dryer includes a plurality of cup shaped lifting flights 30 seen in cross section in FIGURE 3. It will also be noted that FIGURE 3 illustrates the level of material in the dryer, and shows the action of the flights in creating the cascading veil of material mentioned at the outset of this specification.

The next section of the dryer contains the cup shaped lifting flights 32. These flights are identical to the flights 30 in the preceding section, and are equal in number. However, by comparing FIGURES 3 and 4, it will be observed that the flights 30 and 32 are staggered with respect to each other. It is believed that this construction, while providing a definite veil pattern, gives a more uniform veil density across the drum, and hence provides better drying action.

Figure 4:
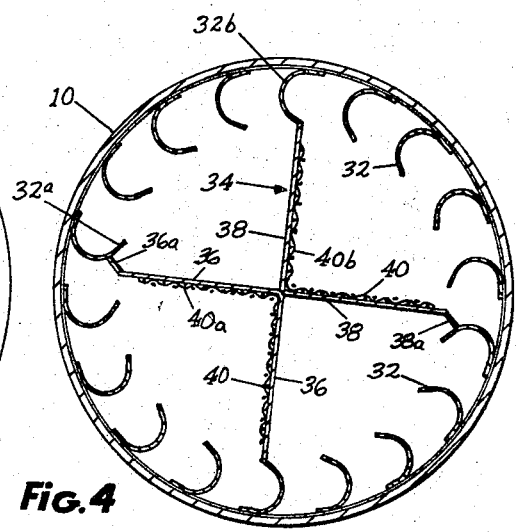
FIGURE 4 is a cross sectional view along the line 4—4 of FIGURE 2.

As seen in FIGURE 4, the portion of the dryer containing the flights 32 is provided with the cross braces indicated generally at 34. Specifically, the braces may be formed by securing the two angle braces 36 and 38 to the outer edges of the flights 32. Because of the spacing of the flights in this embodiment of the invention, one leg of each of the angle members 36 and 38 is provided with the bent ends 36a and 38a respectively. It will be apparent that the braces 36 and 38 could alternatively be secured to the drum 10 itself, if desired.

Figure 2:
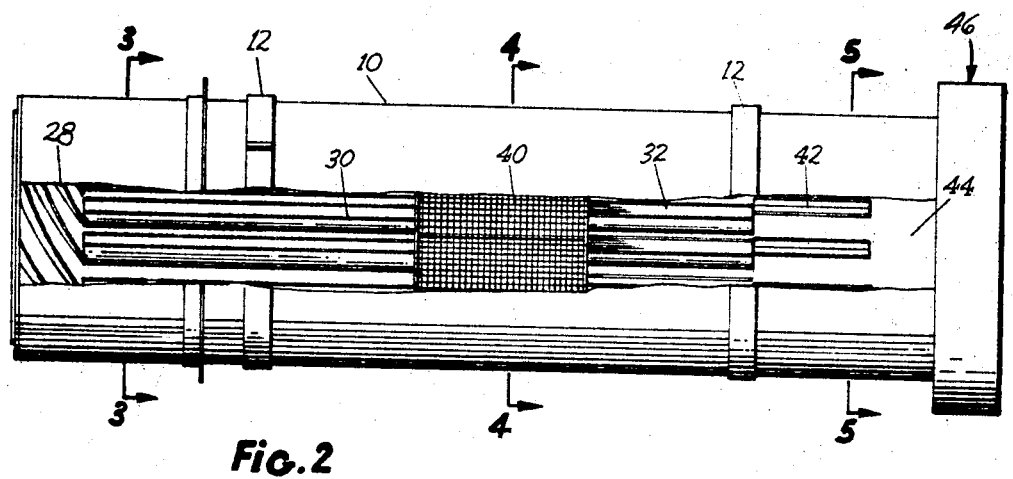
FIGURE 2 is a longitudinal cross sectional view through the rotary drum shown in FIGURE 1.

In the embodiment shown in FIGURE 2, it will be observed that one cross brace 34 is disposed at the end of the flights 32 nearest the inlet or charging end of the dryer. A second cross brace 34 (aligned with the first cross brace) will be spaced somewhat nearer the discharge end of the dryer.

As best seen in FIGURE 4, the brace members 36 and 38 carry the four screen sections 40. The innermost longitudinal edges of the four screen sections 40 substantially meet along the axis of the dryer. It will also be observed that the outer longitudinal edge of the screen sections 40 are spaced from the inner edge of the flights 32 by a distance generally equal to the diameter of the cup shaped flights.

The next section of the dryer drum 10 includes the tumbling flights 42. As will be seen in cross section in FIGURE 5, the tumbling flights are simply pieces of angle iron suitably secured to the interior of the drum. Relatively speaking, they are somewhat smaller than the flights 30 and 32, and serve to decelerate the aggregate in the presence of the high temperature heat. In addition, the region between the ignition tile 24 and the end of the flights 32 will be free of the veils of aggregate referred to earlier to permit full combustion of the fuel from the burner.

After leaving the tumbling flights 42, the aggregate passes into the portion of the dryer drum 44 (FIGURE 2) which contains no vanes or flights at all. The elimination of lifts or flights in this section of the drum enhances the discharge of the material into the high lift portion indicated generally in FIGURE 1 at 46.

Figure 5:
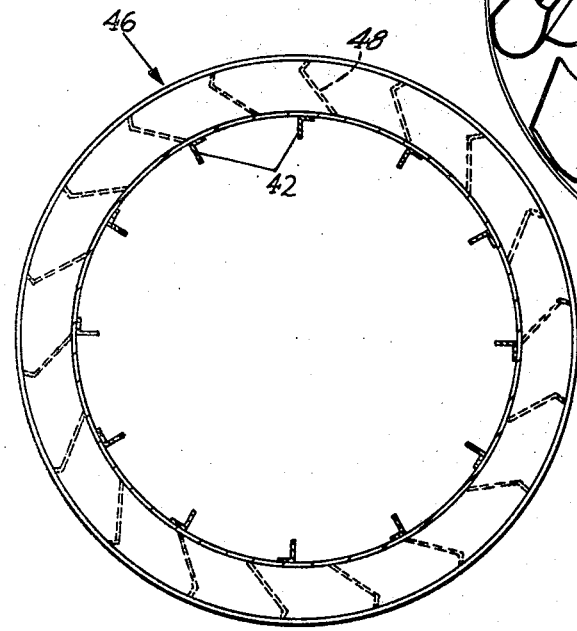
FIGURE 5 is a cross sectional view along the line 5—5 of FIGURE 2.
Figure 6:
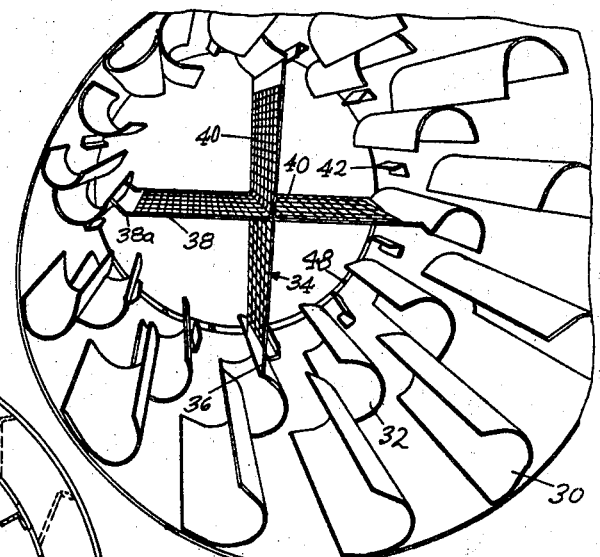
FIGURE 6 is a perspective view of the interior of the dryer showing the invention.

The high lift portion 46 includes a plurality of flights 48 as seen in end elevation (dotted lines) in FIGURE 5. By noting the angular position of these flights, it will be recognized that the material leaving the portion 44 of the drum will be carried by the flights 48 upwardly to nearly a vertical center line before discharge. This permits the use of the off center discharge chute 20 briefly described earlier.

It is believed that operation of the dryer of this invention will be clear from the foregoing description. That is, as already indicated, the drum 10 will be rotated about its axis at a speed on the order of 10 revolutions per minute. The inclination of its axis from vertical will be on the order of ¾" per foot. Material entering the drum through the inlet chute 16 will be rapidly conveyed by the angular flights 28 into the first section of the dryer containing the cup shaped lifting flights 30. Rotation of the drum and lifting flights will cause the aggregate to be carried upwardly by the lifting flights until it overflows the free edge of the flight. The resulting discharge from the series of flights provides a cascading veil of material which might be considered as a plurality of layers with air spaces between them.

As previously indicated, the flights 30 and 32 are staggered with respect to each other, to provide a staggering of the elements of the veils in these two sections.

Considering the rotation of the portion of the drum shown in cross section in FIGURE 4, it will be apparent that material carried by for example the lifting flight 32a will be discharged onto the screen section 40a. The material of small size can of course pass through the screen, while the larger aggregate particles will be retained on the screen. As the drum continues rotation, the aggregate retained by the screen will roll toward the center axis of the drum, and be held there directly in the path of the hot gases, until the screen section 40b attains a position disposed slightly below horizontal. At this time, a particle trapped by the screen will roll outwardly toward the periphery of the drum, and will fall through the space between the outer longitudinal edge of the screen section 40b and the inner end of lifting flight 32b.

In a commercial embodiment of this invention, a screen having 1" openings was used with considerable success. A screen opening of this size was found to retain only the large aggregate particles, which tests have proved constitute the largest problem with respect to removal of residual moisture.

The skilled worker in the art will of course recognize that air temperatures within the drum 10 constantly decrease as you move from the discharge end of the drum (the end nearest the burner) to the inlet end of the drum. From the standpoint of heating and moisture elimination, it would be most desirable to locate the cross braces 34 and screen sections 40 as near the burner end of the drum as is possible. But on the other hand, the temperatures attained in this portion of the drum are so high as to cause an extremely rapid deterioration of almost any commercially acceptable material. It is therefore necessary to so locate the screen and cross braces as to attain a balancing between the interests of long component life, and maximum drying of the aggregate. In the commercial dryer briefly noted above, a screen section was utilized begining at the end of the flights 32 farthest from the discharge end of the drum, and extending approximately ⅔ of the length of the flights 32. A second set of cross braces and screen sections was used in the portion of the drum containing the cup shaped flights 30. The screen in this portion of the drum was disposed at that end of the flights 30 nearest to the flights 32, and extended for approximately ⅓ of the length of the flights 30.

Empirical tests with the commercial installation noted above disclosed a maximum retained moisture content of 0.3%. Earlier tests with substantially the same dryer except for the elimination of the cross brace and screen arrangement described herein yielded retained moisture contents as high as 1.7%. In every case, the screen and cross brace arrangement resulted in at least a 60% decrease in the amount of moisture retained.

While the invention has been described in terms of an exemplary embodiment, various modifications may be made by the skilled worker in the art without departing from its scope and spirit. Accordingly, no limitations are to be inferred or implied except insofar as specifically set forth in the following claims.

The embodiments of the invention in which an exclusive property or privilege is claimed are defined as follows:

1. In a rotary dryer for aggregate having a cylindrical drum mounted for rotation about an axis inclined slightly from horizontal, and means for rotating said drum, the improvement comprising:
 (a) a plurality of longitudinally extending lifting flights equally spaced about the interior surface of said drum and arranged to lift and discharge aggregate in said drum in a plurality of veils;
 (b) perpendicularly arranged transverse cross brace members in the vicinity of said flights; and
 (c) screen sections carried by and secured to said brace members, said screen sections preventing passage of at least some of said aggregate veil completely across said drum.

2. The improvement claimed in claim 1 wherein the outer longitudinal edges of said screen sections are spaced inwardly from the free edge of said flights, permitting passage of aggregate therebetween.

3. The improvement claimed in claim 2 wherein the longitudinal dimension of said screen sections is on the order of ½ the longitudinal length of said flights.

4. The improvement claimed in claim 1 wherein said screen sections are perpendicularly arranged and divide said drum into 4 discrete communicating quadrants.

5. The improvement claimed in claim 1 wherein the openings in said screen sections are of a size large enough to retain only the larger particles of said aggregate.

6. The improvement claimed in claim 5 wherein the openings in said screen sections are on the order of 1″ square.

7. The improvement claimed in claim 1 wherein the interior of said drum includes two sets of lifting flights, angularly staggered with respect to each other, said cross braces and screen sections being longitudinally disposed in the vicinity of said flights nearest the discharge end of said drum.

8. The improvement claimed in claim 7 wherein said screen sections are spaced longitudinally away from the discharge end of said drum.

9. The improvement claimed in claim 8 wherein the longitudinal dimension of said screen sections are on the order of ⅔ of the longitudinal length of said last mentioned flights.

10. In a rotary dryer for aggregate having a cylindrical drum mounted for rotation about an axis inclined slightly from horizontal, means for rotating said drum, and means for providing a flow of high temperature combustion gases through said drum, the improvement comprising:
 (a) a plurality of screen sections mounted in the interior of said drum and effective to divide said drum longitudinally into a plurality of discrete, communicating compartments, the outer longitudinal edge of said screen sections being spaced inwardly from the inner surface of said drum to permit passage of aggregate therebetween, and
 (b) means fixedly supporting said screen sections, whereby said screen sections suspend the large aggregate particles in the flow of high temperature combustion gases and decelerate the movement of said aggregate particles through said drum resulting in a substantial increase in heating time for reducing internal moisture.

References Cited
UNITED STATES PATENTS

| | | | |
|---|---|---|---|
| 846,574 | 3/1907 | Lambert | 34—137 XR |
| 1,797,831 | 3/1931 | Luther | 263—32 |
| 2,666,633 | 1/1954 | Bojner | 34—137 XR |
| 3,142,546 | 7/1964 | Coats | 34—137 |

FREDERICK L. MATTESON, JR., *Primary Examiner.*

A. D. HERRMANN, *Assistant Examiner.*